(12) United States Patent
Demir et al.

(10) Patent No.: US 7,951,425 B2
(45) Date of Patent: May 31, 2011

(54) METAL COATED NANO FIBRES

(75) Inventors: Mustafa Muammer Demir, Orhanli (TR); Mehmet Ali Gulgun, Tuzla-Istanbul (TR); Yusuf Ziya Menceloglu, Tuzla-Istanbul (TR)

(73) Assignee: Sabanci Universitesi, Tuzla-Istanbul (TR)

( * ) Notice: Subject to any disclaimer, the term of this patent is extended or adjusted under 35 U.S.C. 154(b) by 1043 days.

(21) Appl. No.: 10/569,968

(22) PCT Filed: Aug. 28, 2003

(86) PCT No.: PCT/TR03/00072
§ 371 (c)(1),
(2), (4) Date: Apr. 18, 2007

(87) PCT Pub. No.: WO2005/021845
PCT Pub. Date: Mar. 10, 2005

(65) Prior Publication Data
US 2007/0218281 A1   Sep. 20, 2007

(51) Int. Cl.
*C08J 7/04* (2006.01)
(52) U.S. Cl. ............... 427/322; 428/389; 264/10
(58) Field of Classification Search .......... 427/322
See application file for complete search history.

(56) References Cited

U.S. PATENT DOCUMENTS

| 5,681,617 | A | * | 10/1997 | Lin et al. | 427/299 |
| 6,159,370 | A | * | 12/2000 | Hicke et al. | 210/500.43 |
| 6,346,136 | B1 | * | 2/2002 | Chen et al. | 75/343 |

OTHER PUBLICATIONS

Drew et al., Nano Letters, vol. 3, No. 2, pp. 143-147, Jan. 17, 2003.*
Yang Q B et al: "Preparation and Characterization . . . Electrospinning"; Synthetic Metals, No. 137; Apr. 4, 2003, pp. 973-974; XP002279192.
Drew C et al: "Metal Oxide-Coated Polymer Nanofibers"; Nano Letters; vol. 3, No. 2, Jan. 17, 2003; pp. 143-147; XP002279193.
Mironov A V et al: "Nanofibres Based on Associating . . . Electrospinning"; Nov. 24, 2001; Safin 2001; Euroconference on Self-Assembled Fibrillar Netowrks—Book of Abstracts; p. 83, Autrans, France, XP002279194.

* cited by examiner

*Primary Examiner* — Timothy H Meeks
*Assistant Examiner* — Nathan T Leong
(74) *Attorney, Agent, or Firm* — Ladas & Parry LLP

(57) ABSTRACT

The present invention relates to a process for the metal coating of nano-fibers by electrospinning, to the metal coated nano-fibers obtained by this process and to the use of said metal coated nano-fibers. The process is characterized in that a polymer nano-fiber with functional groups providing the binding ability to a reducing reagent is prepared by electrospinning at ambient conditions. Then this is contacted with a reducing agent, thereby opening the epoxy ring on the surface of polymer nano-fiber and replacing with the reducing agent and the reducing agent modified film is reacted with metal solution in alkaline media. Finally the electrospun mat is treated with water to open the epoxy rings in the structure and crosslinking the chains to provide integrity.

6 Claims, 8 Drawing Sheets

METAL COATED NANO FIBRES

The present invention relates to a process for the metal coating of nano-fibres, to the metal coated nano-fibres obtained by this process and to the use of these metal coated nano-fibres.

Nano-science has attracted much attention due to the fact that materials exhibit unusual properties from their bulk states. Optical and electrical properties of compounds/elements depend mainly on their size we are interested.

Electro-spinning is a novel and efficient fabrication process that can be used to assemble fibrous polymer mats composed of fibre diameters ranging from several microns to fibres with diameter lower than 50 nm. The fibres are formed using an electrostatically driven jet of polymer solution (or polymer melt), emitted from the apex of a cone formed on the surface of a droplet of polymer or polymer solution. As this jet travels through the air, it solidifies leaving behind a polymer fibre to be collected on an electrically grounded target.

Construction of nano-scale composite fibres by electro-spinning from a mixture of rigid rod aramid polymers and flexible polymers is also feasible. Applicants refer to Srinivasan G. Reneker D H. Polymer International 1995; 36:195 and to Demir M. M.; Yilgor E.; Yilgor I.; Erman B.; Polymer 2002, 42, 3303. There is a growing interest in the field of metallisation of polymeric surfaces like explained in Bicak, N.; Sungur S; Tan N.; Bensebaa F.; Deslandes, Y. J. Poly. Sci. Part A Polymer Chemistry 2002, 40, 748. Silver can be used for following reactions in terms of catalytic activity in modified catalyst for oxidative conversion of methanol to formaldehyde as explained in Butenko A N, Savenkov A S; Russ J. Appl Chem+ 2000, 73 (11), 1942-1945, 44 (2), 145-146, butadiene epoxidation as explained in Monnier J R, Medlin J W, Barteau J Catalysis 2001, 203 (2) 362-368.

A method for forming metal particles and fibres is explained in U.S. Pat. No. 6,346,136. This document uses carbon nano-tubes or carbon nano-fibres as templates which are mixed with solvated metal salt precursors, followed by calcination and reduction of the above mixture at an elevated temperature and under a flow of inert or reductive gas. This document does not use electro-spinning.

Conductive nanoscale diamater fiber was obtained by electrospinning of conductive polymer, polyaniline and polyethylene oxide blend. The conductivity of nanofilament was expected to be as conductive as bulk polymer as explained in WO 01/51690 A1.

The aim of the invention is to provide a general simple, inexpensive, method controllably generating metal-coated electronic fibres.

It is also an aim of the invention to provide for a time and cost saving new process for the metallisation of nano-fibres by electro-spinning at ambient conditions.

It is also an aim of the present invention to provide metallised high surface area nano-fibres obtained by this new process.

It is also an aim of the present invention to consistently fabricate nano-fibres of an organic polymer electro statically in which diameters of all fibres fall well within the definition of a nano-material.

It is another aim of the present invention to provide multiple uses of said metallised nano-fibres. It is another aim of the present invention to provide products containing said metallised nano-fibres.

The above aims have been achieved by Applicants invention, which is directed to a process for the preparation of metal-coated polymer nano-fibres, characterised in that a) preparing a polymer nano-fibre with functional groups providing the binding ability to a reducing reagent by electro-spinning at ambient conditions;
b) contacting the electrospun polymer nano-fibre obtained in step a) with a reducing agent, thereby opening the epoxy ring on the surface of polymer nano-fibre and replacing with the reducing agent;
c) reacting the reducing agent modified polymer film obtained in step b) with a metal salt solution in alkaline media;
d) treating the electrospun mat obtained in step c) with water to open the epoxy rings in the structure and crosslinking the chains to provide integrity.

The invention is also directed to the metallised nano-fibres obtained by this process and to the use of said metallised nano-fibres.

It is to be understood that the foregoing general description and the following detailed description are exemplary and explanatory and are intended to provide further explanation of the invention as claimed.

The accompanying drawings, which are included to provide a further understanding of the invention and are hereby incorporated in and constitute a part of this specification, illustrate embodiments of the invention and together with the specification serve to explain the principles of the invention.

Figure 1:
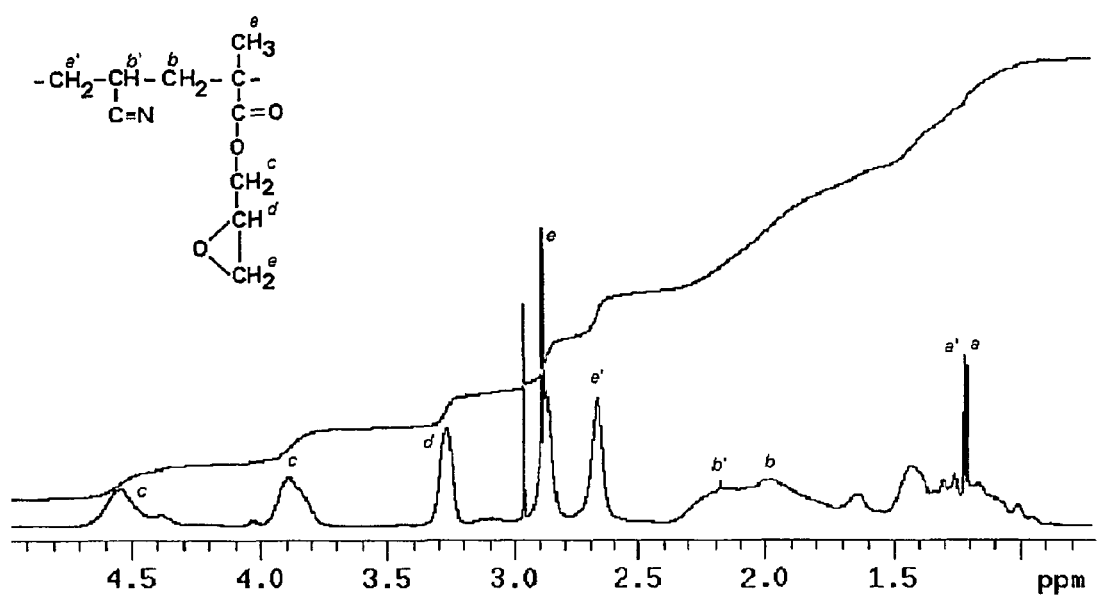
FIG. 1 shows the $^1$H NMR spectrum of poly(acrylonitrile-co-glycidylmethacrylate) (PGMA)

As stated hereinabove the invention relates to a process for the preparation of metal-coated polymer nano-fibres, characterised by the following steps:

a) preparing a polymer nano-fibre with functional groups providing the binding ability to a reducing reagent by electro-spinning at ambient conditions;
b) contacting the electrospun polymer nano-fibre obtained in step a) with a reducing agent, thereby opening the epoxy ring on the surface of polymer nano-fibre and replacing with the reducing agent;
c) reacting the reducing agent modified polymer film obtained in step b) with a metal salt solution in alkaline media;
d) treating the electrospun mat obtained in step c) with water to open the epoxy rings in the structure and crosslinking the chains to provide integrity.

The applicants electrospun an insulator type polymer and metallise the resulting nano-fibers by electroless plating method to make conductive. Hydrazination of the oxirane ring is the centre of nucleation of metal crystals on fibre when the electrospun film is reacted with aqueous $AgNO_3$ solution in alkaline media. Metal deposition from its salt solution is known as electroless plating.

The polymer nano fibre is a polymer obtained by radical initiator polymerisation of I) monomers chosen from the group comprising acrylonitrile, styrene, methyl methacrylate, ethylene, propylene with II) functional monomers chosen from the group comprising acrylates, epoxides acrylamides, and acidic comonomers like glycidyl methacrylate, poly hydroxy ethyl methacrylate, methyl methacrylate, 4-hydroxy butyl acrylate, diacetone acrylamide, 2-acrylamide, vinyl phosphoric acid, 2-methyl propane sulfonic acid and acrylamides.

Each monomer gives a different property to the polymer. Polyacrylonitrile (PAN), homopolymer of acrylonitrile monomer is a precursor of the carbon fibres. Presence of acrylonitrile monomer provides ability to obtain carbon nano-fibres. Moreover, PAN in dimethyl formamide is a good polymer-solvent system from aspect of electrostatic spinnability.

The second monomer, for example, glycidyl methacrylate monomer (GMA) is of great interest since the pendant oxirane ring is a very active functional group that can be opened and a range of functionalities could be introduced. The oxirane ring can be opened up easily by hydroxyl and amine groups. In addition, oxirane ring in aqueous media cross-links the polymer chains and electrospun mat gains integrity.

The polymer nano fibre is preferably poly(acrylonitrile-co-glycide methacrylate), because it has an active surface, a self-crosslinkable structure, an ability to modify surface and an ability to obtain carbon fiber.

The reducing agent is chosen from the group comprising hydrazine, alkali borohydride, CuCl and $SnCl_2$. The reducing agent is preferably hydrazine, which easily modifies the active epoxy group of GMA monomer. Hydrogen atom is transferred from hydrazine to epoxy group. Hydrazine can work as a reducing agent even if attached covalently to fiber surface. Hydrazine is used on the fibre surfaces efficiently for metal reductions.

Hydrazination of the oxirane ring is the centre of nucleation of metal crystals on fibre when the electrospun film is reacted with a metal solution in alkaline media. Metal deposition that takes place on hydrazine-modified nano-fibres can be followed easily.

The metal solution comprises soluble transition metal salts in a solvent, comprising $AgNO_3$ in water, AgCl in water, $NiCl_2$ in water, and $PdCl_2$ in DMF. The metal solution is preferably aqueous $AgNO_3$ in alkaline media. To have a metallisation reaction of nanofibers with electroless plating method, $AgNO_3$ must be soluble, i.e. cation and anion should be separated from each other in solution media and should be mobile to conduct the reaction. Metal deposition from its salt solution is known as electroless plating. In contrast to chemical vapour deposition, this method takes place by redox reaction.

The invention also relates to metal coated polymer nano-fibres obtained by the process hereabove as well as to the use of the metal-coated polymer nano-fibres in applications chosen from the group comprising nanotubes, catalysts, conductors, solar cells, fuel cell electrodes for sensors, electrochemical actuators, proton exchange membranes and electrodes, hydrogen storage membranes, high density packing structures, thin film transistors, reflectors, compact disks and decorative applications. The invention relates also to catalysts and conductors containing metal-coated polymer nano-fibers.

During the preparation of metal-coated polymer nano-fibres a two step procedure was followed as illustrated in the following steps:

Step 1 Modification of Epoxy Ring

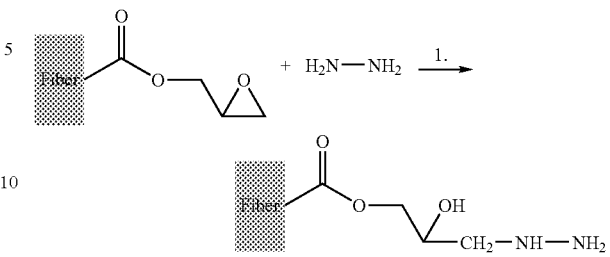

The first step is the modification of epoxy ring on P(AN-GMA) nano-fibre via hydrazine. Ring opening reaction of epoxide replaces with the hydrazine that is known as a reducing agent. Hydrazination of epoxy ring was followed by IR spectroscopy with appearing of 3216 $cm^{-1}$ bands coming from the —$NH_2$ group.

Figure 2:
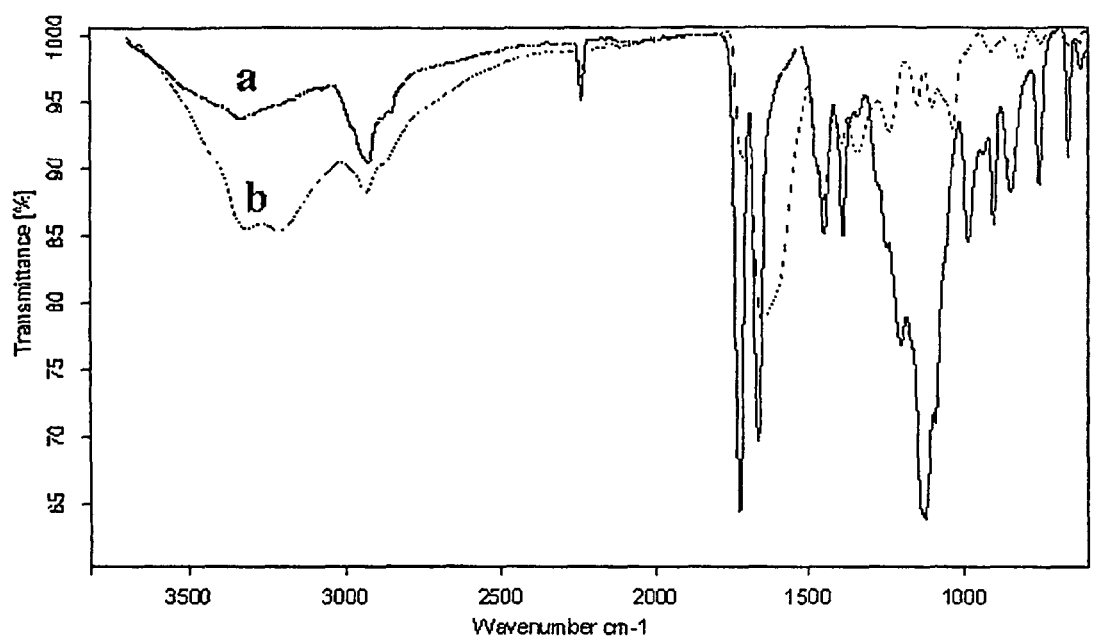
FIG. 2 is the IR spectra of (a) P(AN-GMA) and (b) Hydrazine treated P(AN-GMA)

In FIG. 2, the appearance of 3216 cm–1 and disappearing of 906 cm–1 bands confirm the opening of epoxy ring by the hydrazine molecule. The broad and intense band observable over 3000 $cm^{-1}$ contains the hydroxyl and amine groups. The fact that the morphology and diameter of the fibres remain unchanged after surface modification can be seen on FIG. 3.

Step 2—Redox Reaction

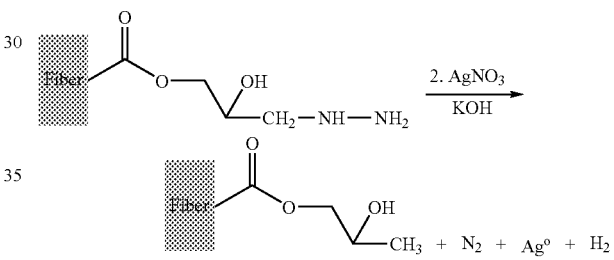

The second step is a redox reaction between hydrazine attached to electro-spun fibres and Ag cations in solutions. Oxidation of hydrazine reduces and deposits Ag metal nanoparticles on the fibres under aqueous alkaline media. The reaction takes place within several minutes.

The metallisation of polymer fibres begins on the fibre surface. When the metallisation process is completed, electrospun mat is treated with water. Cross-linked structure is obtained because the epoxy ring in the structure cross-links the chains. Oxirane rings are used for metallization process and for crosslinking reaction.

In order that the invention may be more readily understood, reference is made to the following examples, which are intended to illustrate the invention, but not restrict or limit whatsoever the scope thereof.

EXAMPLES

All the chemicals used were analytical-grade chemicals and were used without any further purification. These are: glycidyl methacrylate GMA (Fluka), acrylonitrile (AN); (Fluka), and hydrazinium hydroxide (100%; E. Merck), styrene (STY)(Merck).

Example 1 a) Preparation of the Copolymer

In a 100 ml flask 34.16 ml dimethyl formamide (DMF) 12.64 g acrylonitrile (AN), 23.35 g glycidyl methacrylate (GMA) monomers and 0.47 g ammonium persulphate initiator is added. Amount of AN and GMA in the monomer mixture was 60 and 40 percent per mole respectively. The mixture is heated to 50° C. and stirred over a period of 24 hours for radical polymerisation. 75 ml polymer solution having 30% wt solid content is obtained. Poly (acrylonitrile-co-glycidyl methacrylate) copolymer composition was determined by using $^1$HNMR spectrum (Varian 500 MHz) of the polymer, which is shown in FIG. 1.

It is shown that a well-defined poly (acrylonitrile-co-glycidyl methacrylate) can be prepared by radical polymerisation. The proton resonance for the oxirane ring was assigned to the peaks at 3.26 ppm (d), 2.88 ppm, and 2.95 ppm (e). GMA content of the polymer was estimated from the NMR spectra via the integration of the characteristic peaks of epoxy over those of acrylonitrile. The amount of GMA is found as 58% wt on the chain. By definition, $r_1$ (AN) and $r_2$ (GMA) represent the relative preference of a given radical that is adding its own monomer to the other monomer. The multiplication of the reactivity ratio of two monomers is nearly 1 indicating the ideal copolymerisation.

b) Fabrication of Fibres

The polymer solution from Example 1 is placed in an Pasteur pipette and subjected to 12.3 kV electrical potential. A grounded sheet was positioned across the high voltage probe that was in a glass tube filled with polymer solution. When potential difference overcomes the surface tension, a thin jet ejected from the polymer droplet being held on the glass tip. Solvent was evaporated and nano-scale fibres remain on the grounded sheet. Eventually, a mat-like structure was obtained and can be easily detached from the foil. Polymer solution was held in a glass capillary. The diameters of the capillary and the tip were 5 and 1 mm, respectively.

The electrical field was provided by a high voltage (HV) 50 kV with 500 µA direct current. The output voltage and the current between grounded aluminium sheet and the copper probe were measured from an external connection of the power supply with multimeter. The potential difference between the pipette and the ground used to electrospin varied in the range 0-35 kV.

The copper probe of the HV generator was inserted into the capillary and electricity was conducted through the solution. The capillary was tilted approximately 10° from the horizontal to maintain a droplet of solution at the tip of the pipette. A grounded aluminium sheet was positioned opposite and perpendicular to the tip of the pipette onto which the fibres were deposited. After solvent evaporation, fibres were ready for characterisation.

All products were electro-spun under 1.53 kV/cm electrical field. Electro-spun fibre mat on P(AN-GMA) was electrospun successively from solution in DMF under variance of electrical field. The diameter of the fibres was on the order of 250 nm under 1.53 kV/cm. Spinning process had continued for nearly 6 hrs to obtain thick enough electrospun mat.

c) Modification of the Polymer Webs with Hydrazine 700 mg electrospun polymer web was mixed with 20 ml hydrazinium hydroxide (100%) in a 250-mL flask and stirred overnight. Than it washed with 500 ml methanol 6 times. The distilled water had been deaerated with a flow of 0.5 bar duration of 20 min nitrogen gas. The product was dried at 50° C. for 24 h in vacuum.

A two-step procedure was followed during the preparation of metal-coated polymer nano-fibres. The nano fibres were analysed with IR spectra (Bruker Equinox 55) and under JEOL mark (840A) electron microscope with different magnifications. The IR spectra of (a) P(AN-GMA) and (b) hydrazine treated P(AN-GMA) fibres is given in FIG. 2. FIG. 2 confirms the opening of epoxy ring by the hydrazine molecule by appearing of 3216 cm$^{-1}$ and disappearing of 906 cm$^{-1}$ bands. The broad and intense band observable over 3000 cm$^{-1}$ contains the hydroxyl and amine groups.

Figure 3:
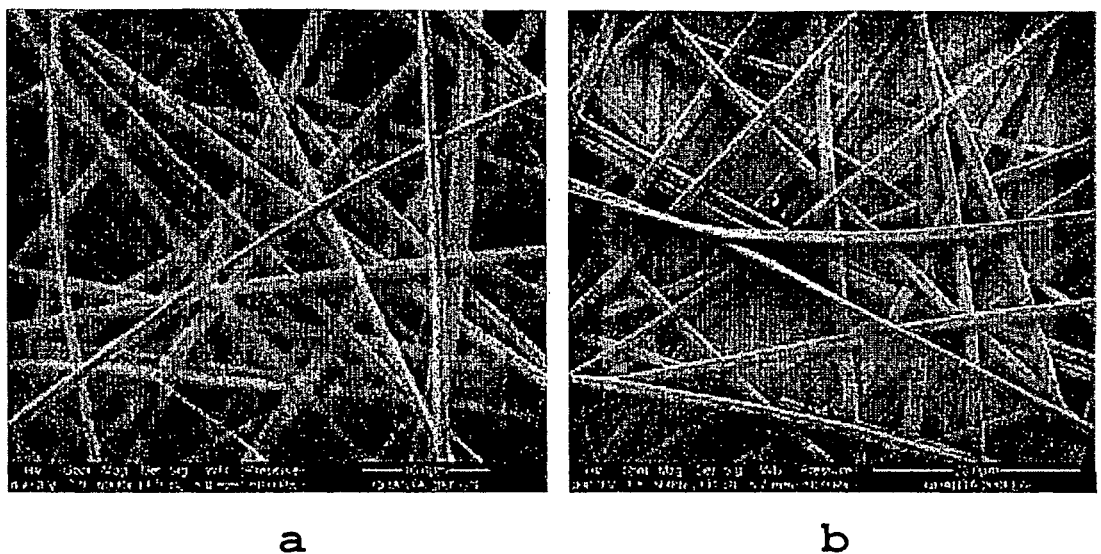
FIG. 3 shows the electron microscope images of (a) P(AN-GMA) and (b) Hydrazine treated P(AN-GMA)

FIG. 3 gives the electron microscope images of a) the fibres at 10 microns and b) the hydrazine treated fibres at 20 microns. To see the effect of hydrazination on fiber morphology, PGMA—homopolymer of GMA—was synthesized and performed electrospinning. Electrospun nanofibers were treated with hydrazine. Electron microscope was employed to image the nanofibers before and after hydrazination. As can be seen the morphology and diameter of the fibres remain unchanged after surface modification d)—Deposition of Silver 700 mg of the hydrazine modified electro-spun mat was introduced into a mixture of 5 ml of a 0.1M AgNO$_3$ solution, 0.5 ml of a 1M KOH solution and 1 ml concentrated NH$_3$ solution in a closed glass bottle. The immediate precipitation of the metal onto nano-fibre takes place within few minutes.

e)—Analysis

The Thermo Gravimetric Analysis (TGA)

Figure 4:
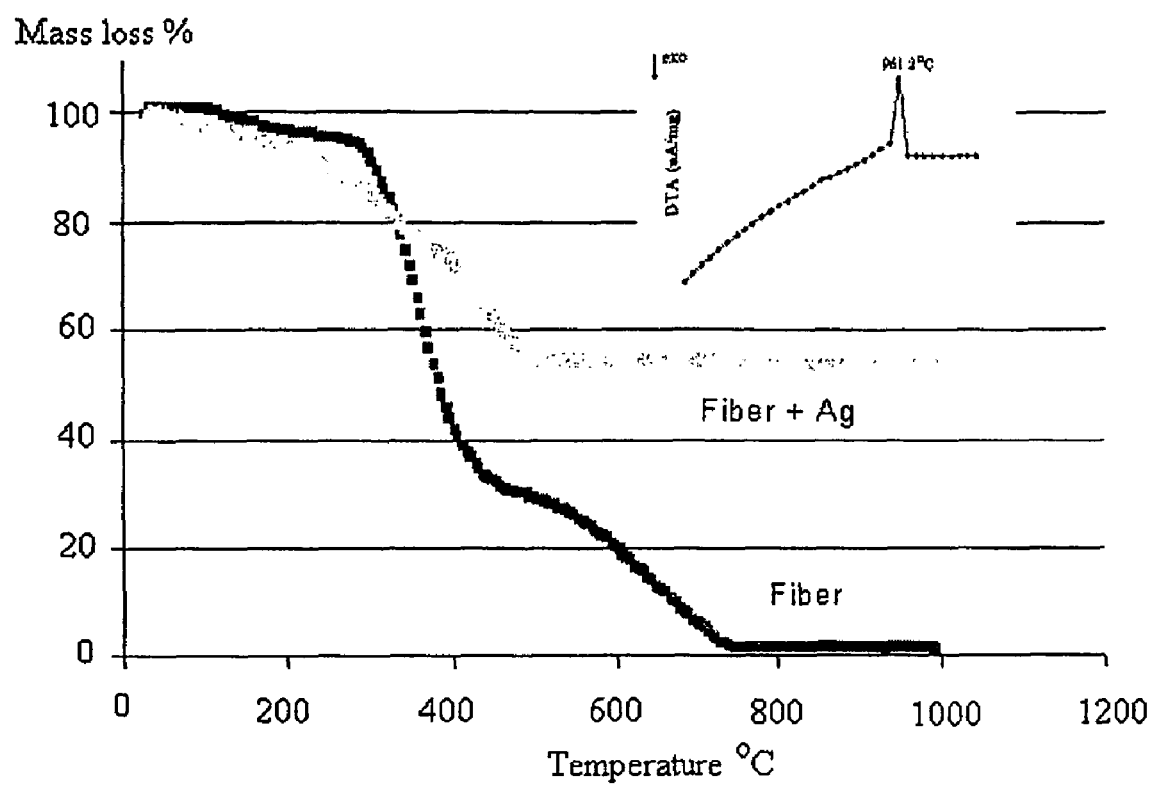
FIG. 4 shows the thermo-analytical curves of P(AN-GMA) and Ag treated hydrazine modified P(AN-GMA)

The TGA was performed using Netzsch STA 449C under oxidative media to burn the polymer into H$_2$O and CO$_2$. A heating rate of 10° C. was used to heat the 700 mg samples from room temperature to 1000° C. The thermo-analytical curves of P(AN-GMA) and Ag treated hydrazine modified P(AN-GMA) is presented in FIG. 4.

The thermo-oxidative decomposition of two products precedes different paths from room temperature to 1000° C. with 10° C. increase per minute. Degradation occurred and mass decreased as the temperature increases. While only 2% of polymer moiety remains beyond 750° C. under thermo-oxidative environment for P(AN-GMA), for metal deposited sample, 55% of total mass was measured at the end of the thermal analysis. Mass loss of the samples before and after metallisation procedure was attributed to the amount of silver deposited on the electro-spun mat. Additionally, the melting point of Ag is 961° C. is observed as an endothermic peak.

The X-ray Diffraction Analysis

Figure 5:
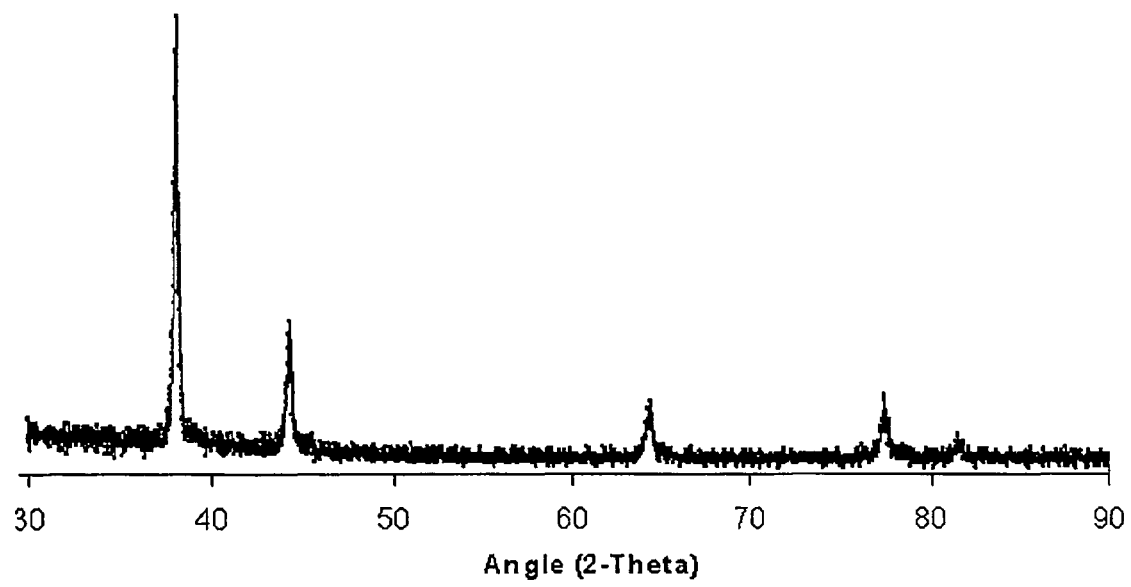
FIG. 5 shows the X-ray diffraction analysis of Ag particles on the P(AN-GMA) nanofibers

FIG. 5 illustrates the X-ray diffraction (XRD) curve for P(AN-GMA) after the metallisation process of Ag cation. Five peaks were detected on the X-ray spectra between 30-90°. Main peak appeared around 2θ=38.1° corresponding to the (111) peak of Ag. Other four peaks were at 44.3°, 64.5°, 77.4°, 81.8°. The bars on the spectrum are from the JCPDS reference diffraction data file for Ag. The spectrum of the mats with Ag matches the one for Ag.

The dimensions of the Ag particles were estimated by using Debye-Scherer formula ($\beta=0.9\times\lambda/(FWHM\times\cos\theta)$). l3 is the size of the Ag crystals, FWHM is the values of full width at half maximum of the main peak. The calculated average size of Ag particles was 43 nm.

The Electron Microscope Analysis

The electron microscope analysis of the nano fibres was performed using Jeol marka electron microscope with 840A model at different magnifications. The accumulated Ag atoms were observed by using high-resolution electron microscopes.

Figure 6:
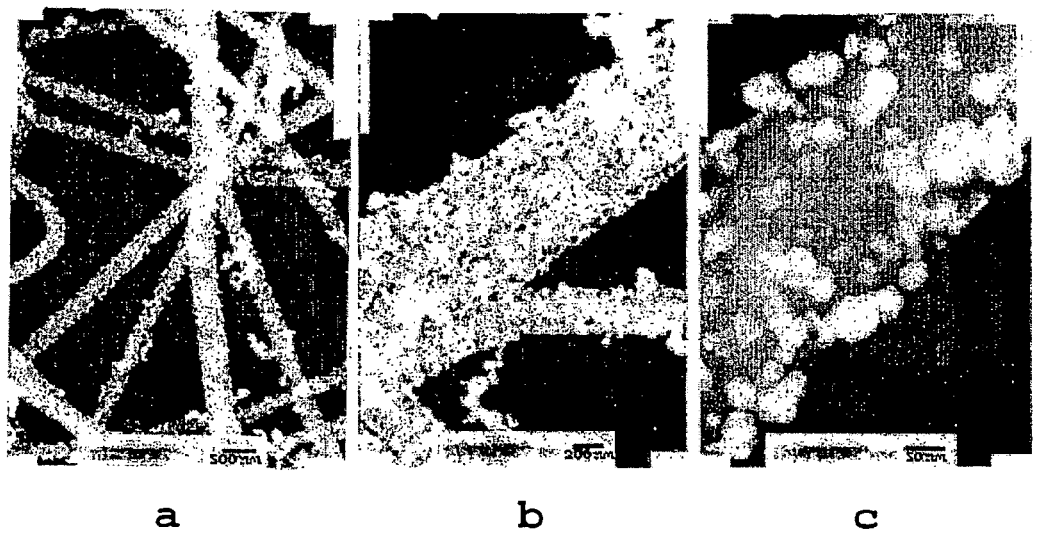
FIG. 6 shows electron microscope images of Ag coated P(AN-GMA) nanofibers at 3 different scales

The electron microscope images of the Ag coated P(AN-GMA) nanofibres at respectively a) 500 nm, b) 200 nm and c) 50 nm are given in FIG. 6 that shows the spherical silver nano-particles on the electro-spun nano-fibres after reduction of silver cations. The metal nano-particles were heterogeneously distributed on the fibre surface.

The phase difference between polymer and metal nano-particles can be seen easily due to the atomic number difference between carbon (12) and silver (107) atoms. The shape of the particles is spherical, average diameter of the particle size measured from the graph is 40 nm. Particle size calculated from peak broadening of X-ray spectra matches with the size measured from the electron microscope images. This result indicates that silver atoms are single crystals. It should be emphasised that all particles are stated on the surface of the nano-fibres.

Figure 7:
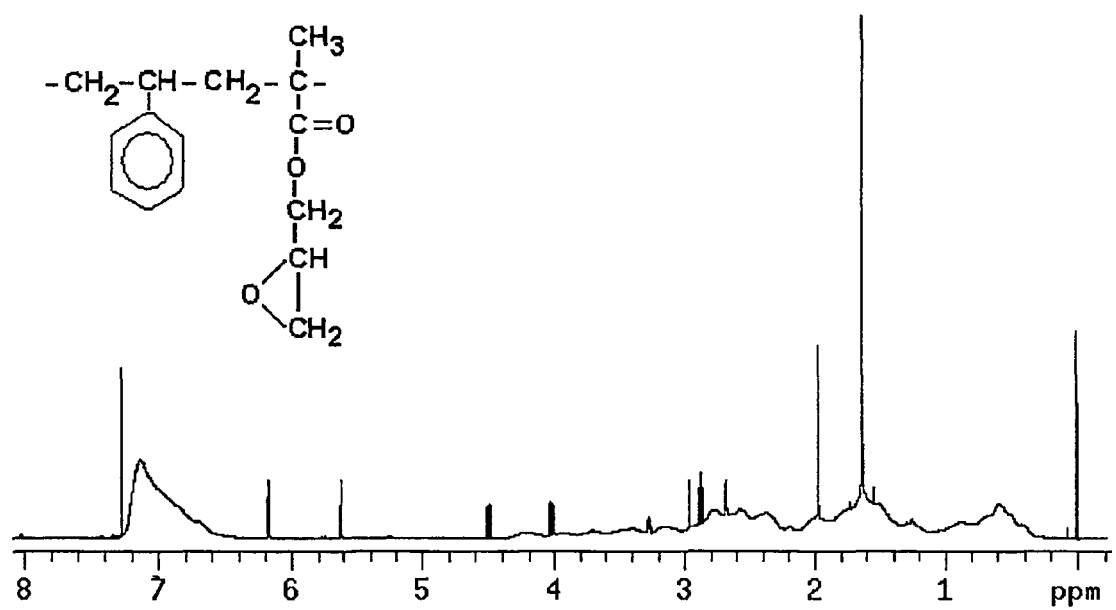
FIG. 7 shows the $^1$H NMR spectrum of poly(styrene-co-glycidylmethacrylate)

Example 2 a) Preparation of the Copolymer 30 ml tetrahydrofuran (THF), 15 g styrene (STY), 15 g glycidyl methacrylate (GMA) monomers and 0.08 g azo-bis-iso-butylonitrile (AIBN) initiator are added in a 100 ml flask. Amount of STY and GMA in the monomer mixture were respectively 42% and 58% per mole. The mixture is heated to 80° C. and stirred over a period of 26 hours for radical polymerisation. 75 ml polymer solution having 50% wt solid content is obtained. Poly (styrene-co-glycidyl methacrylate) copolymer composition is determined by using $^1$HNMR spectrum (Varian 500 MHz) of the polymer, which is shown in FIG. 7.

b) Fabrication of Nanofibers

Figure 8:
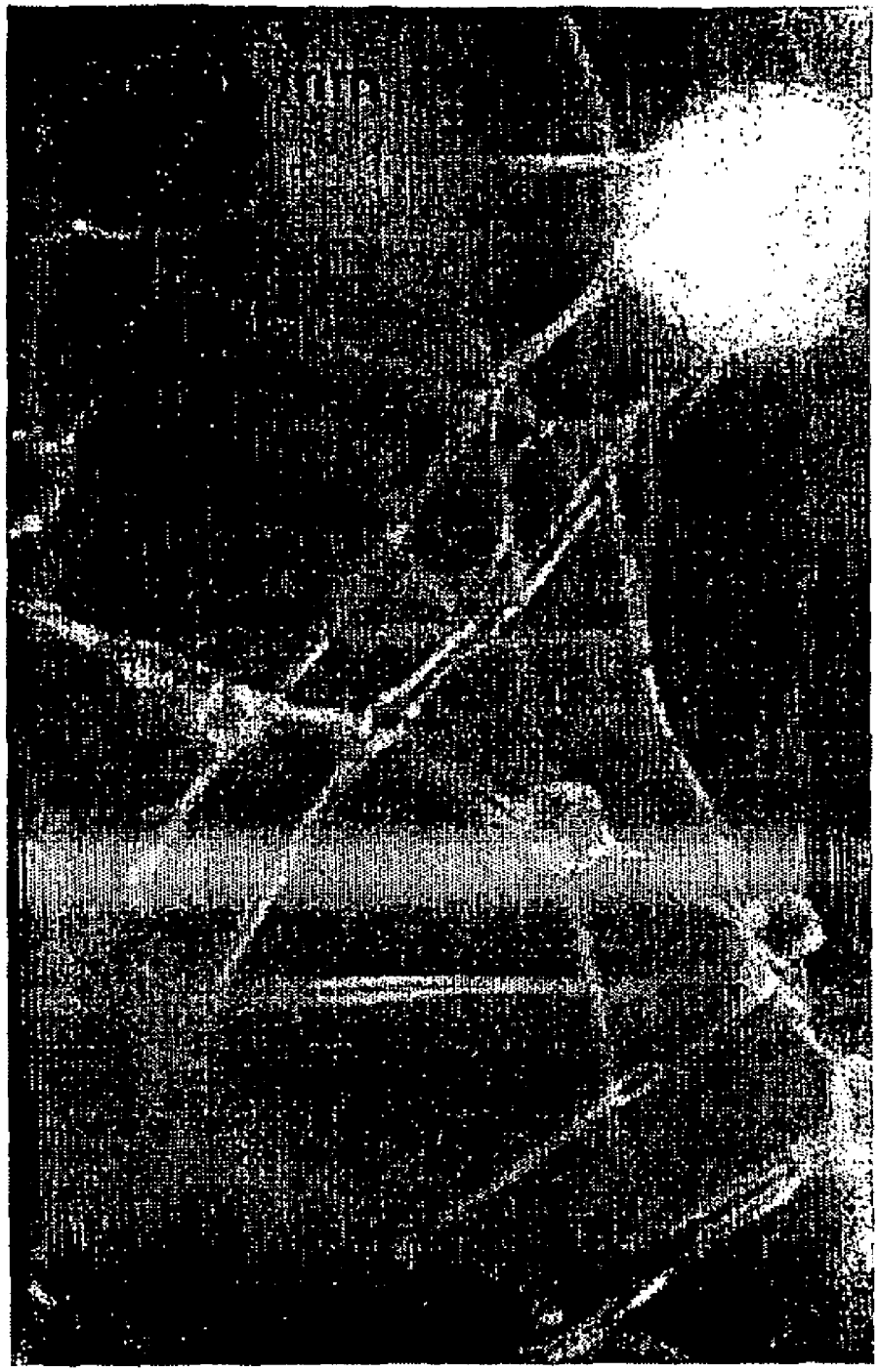
FIG. 8 shows Optical Microscope image of poly(styrene-co-glycidylmethacrylate) nanofibers electrospun from solution at 2 kV/cm.

50% wt of Poly (styrene-co-glycidyl methacrylate) solution in THF is diluted to the 25% wt concentration with DMF. Polymer solution is subjected to 2 kV/cm electrical filed. The diameter of the electrospun fibers shown in FIG. 8 is on the order of 100 nm.

c) Modification of the Polymer Webs with Hydrazine

Electrospun mat that is brittle and transparent was easily removed from the Al foil and immersed into aqueous hydrazine solution. The mat is kept for 48 hours in this reducing media. After washing procedure, the mat is ready to metal coating.

d) Deposition of Silver 1 g of the hydrazine modified electro-spun mat was introduced into a mixture of 5 ml of a 0.1M $AgNO_3$ solution, 0.5 ml of a 1M KOH solution and 1 ml concentrated $NH_3$ solution in a closed glass bottle. The immediate precipitation of the metal onto nano-fibre takes place within few minutes. The mat was kept in reducing media for 24 hours.

e) Analysis

The coated sample is analyzed with XRD from 30° to 90°. The same spectra illustrated at FIG. 5 are obtained.

As can be seen the invention presents a new approach to molecular electronics and provides a general simple, inexpensive, method controllably generating metal-coated electronic fibres. The metallisation of fibres can be easily made saving time and energy.

It is possible to consistently fabricate nano-fibres of an organic polymer electro statically in which diameters of all fibres in given preparations fall well within the definition of a nano-material, i.e. which are on the order of 250 nm with 40 nm Ag nano-particles.

This process provides metal-coated organic polymers with conductive and high catalyst properties. Moreover these metal-coated organic polymers can have the advantage of multiple use since they can be washed and re-used due to its cross-linked structures.

Applications areas for metallised nano-fibres are as follows: charge transporting materials in solar cells, electrodes for biological and chemical sensors, electrochemical actuators, protein exchange membranes and electrodes, hydrogen storage membranes, high density packing structures, thin film transistors, reflectors, compact disks, decorative applications, magnetic materials.

The terms and expressions which have been employed are used as terms of description and not of limitations, and there is no intention in the use of such terms or expressions of excluding any equivalents of the features shown and described as portions thereof. It will be obvious to those skilled in the art that various changes may be made without departing from the scope of the invention which is not be considered limited to what is described in the specification.

REFERENCES (1) Srinivasan G, Reneker D H. Polymer International 1995; 36:195.
(2) Demir M. M.; Yilgor E.; Yilgor I.; Erman B.; Polymer 2002, 42, 3303.
(3) Bicak, N.; Sungur S; Tan N.; Bensebaa F.; Deslandes, Y. J. Poly. Sci. Part A Polymer Chemistry 2002, 40, 748.
(4) Butenko A N, Savenkov A S; Russ J Appl Chem+ 2000, 73 (11), 1942-1945.
(5) Monnier J R, Medlin J W, Barteau J Catalysis 2001, 203 (2) 362-368.
(6) WO-A-01/51690 or Norris I D, Shaker M M, Frank K K, MacDiarmid A G. Synthetic Metals 2000; 114:109.

The invention claimed is:

1. A process for the preparation of metal-coated polymer nano-fibres, comprising the steps of
   a) preparing a polymer nano-fibre with functional groups comprising epoxy rings on a surface of the polymer nano-fibre and epoxy rings in a structure providing the binding ability to a reducing reagent by electro-spinning at ambient conditions;
   b) contacting the electrospun polymer nano-fibre obtained in step a) with a reducing agent, thereby opening the epoxy rings on the surface of polymer nano-fibre and replacing with the reducing agent;
   c) reacting the reducing agent modified polymer film obtained in step b) with a metal salt solution in alkaline media and obtaining an electro-spun mat; and
   d) treating the electrospun mat obtained in step c) with water to open the epoxy rings in the structure and crosslinking the chains to provide integrity.

2. Process according to claim 1, wherein the polymer in step a) is obtained by radical or condensation polymerisation of 1) monomers selected from the group consisting of vinylic monomers and difunctional monomers with 11) functional monomers selected from the group consisting of acrylates, epoxides, acrylamides, and acidic comonomers.

3. Process according to claim 2, wherein the polymer in step a) is selected from the group consisting of poly (acrylonitrile-co-glycidylmethacrylate) and poly (styrene-co-glycidylmethacrylate).

4. Process according to claim 1, wherein the reducing agent in step b) is selected from the group consisting of hydrazine, alkali borohydride, CuCl, and $SnCl_2$.

5. Process according to claim 1, wherein the metal solution in step c) comprises soluble transition metal salts in a solvent, said solution selected from the group consisting of $AgNO_3$ in water, AgCl in water, $NiCl_2$ in water, and $PdCl_2$ in DMF.

6. Process according to claim 4, wherein the reducing agent in step b) is hydrazine.

* * * * *